April 16, 1963     W. D. LOFTUS     3,086,160
CONTROL CIRCUIT USING BISTABLE SEMICONDUCTOR DIODES
Filed Aug. 10, 1960
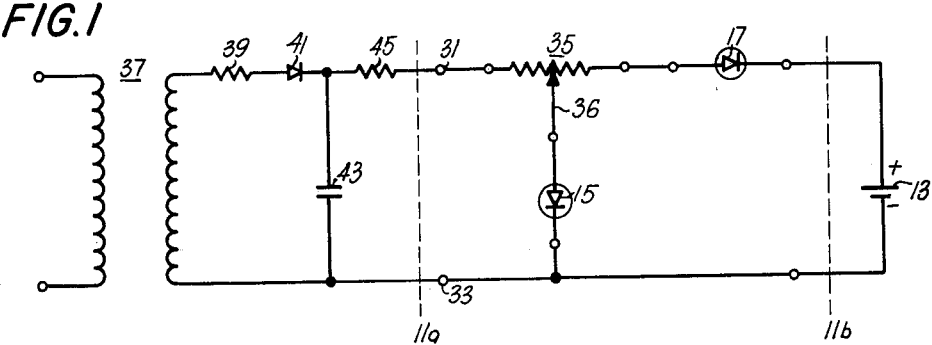
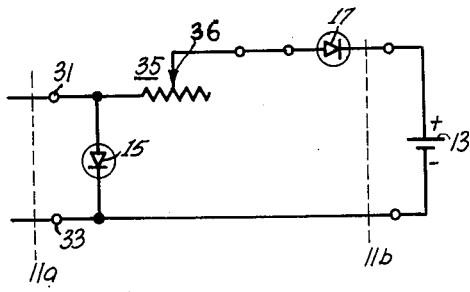
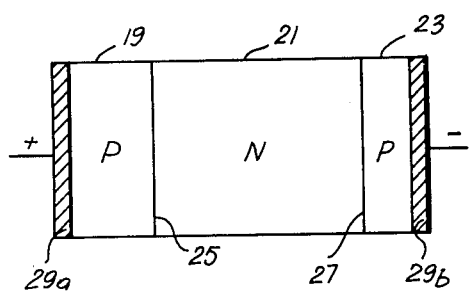
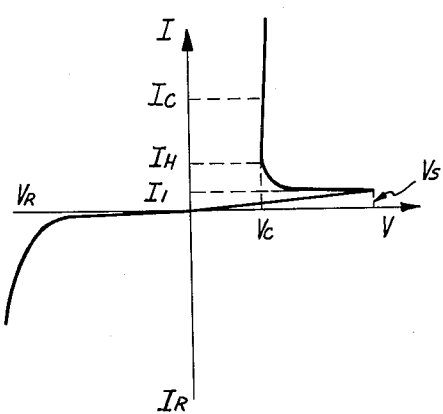
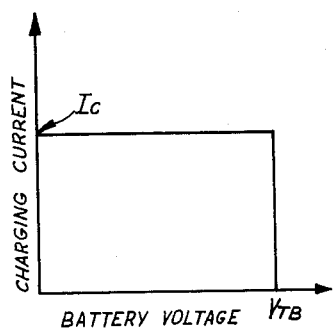
INVENTOR.
WALLACE D. LOFTUS
BY
ATTORNEY

United States Patent Office 3,086,160
Patented Apr. 16, 1963

3,086,160
CONTROL CIRCUIT USING BISTABLE
SEMICONDUCTOR DIODES
Wallace D. Loftus, Indianapolis, Ind., assignor to P. R.
Mallory & Co., Inc., Indianapolis, Ind., a corporation
of Delaware
Filed Aug. 10, 1960, Ser. No. 48,739
10 Claims. (Cl. 320—40)

This invention relates generally to electrical control circuits, and more particularly to a control circuit for supplying electric current to a load and for terminating such current when the load voltage reaches a selected value.

A control circuit in accordance with the invention may be utilized to advantage wherever it is necessary to alter the current supplied to a load in accordance with the load voltage. One such application is for recharging batteries or cells which have been discharged to a greater or lesser degree. With most types of rechargeable cells and batteries it is preferable to supply a substantially constant charging current until the terminal voltage reaches a rated value corresponding to the fully charged condition. In addition, in order to prevent excessive gas generation and decomposition of the electrolyte it is necessary to terminate the charging current once full charge has been attained. Prior attempts to meet both these objectives have necessitated varying degrees of compromise or else have led to highly elaborate and expensive control equipment. Applicant has found, however, that through the use of bistable semiconductor diodes such as disclosed in the co-pending application of R. R. Haberecht and applicant, Ser. No. 41,415, filed July 7, 1960, assigned to applicant's assignee, a novel control circuit may be devised which is simple, compact, economical to construct, and which meets the stated criteria for ideal battery charging.

An object of the invention is to provide a voltage-responsive current control circuit of simple and economical construction and which is capable of delivering a substantially constant current to a load until the load voltage reaches a prescribed value, the circuit then operating to abruptly terminate such current.

A further object is to provide a voltage-responsive current control circuit utilizing a pair of bistable semiconductor diodes as a switch which supplies a substantially constant current to a load until the load voltage reaches a prescribed value, the circuit then operating to abruptly terminate such current.

A still further object is to provide a battery charging circuit of simple and economical construction for supplying a substantially constant charging current to a battery and for terminating such current when the battery voltage reaches its full rated value.

A voltage-responsive current control circuit in accordance with the invention is adapted to supply current to a load and to terminate such current when the load voltage reaches a selected value. Such a circuit comprises a pair of bistable semiconductor diodes respectively adapted to remain substantially nonconductive until the voltage there-across reaches a characteristic switching voltage level at which the diode conducts at a substantially lower constant voltage, the switching voltage level of one of said diodes being greater than that of the second diode and each being adapted to return to the nonconductive state when the current conducted thereby falls below a characteristic holding current level. The circuit may further comprise an input terminal and a common terminal, resistive means being provided for connecting the foregoing one diode across those terminals and for further connecting the second diode and the load there-across in series. The control circuit may also include means for establishing a direct voltage across the input and common terminals which renders the second diode conductive so as to supply current to the load, the resistive means being responsive to such current to cause the voltage across the mentioned one diode to reach the switching voltage level thereof when the load voltage reaches its selected value. When that occurs such one diode will conduct and cause the current through the second diode to fall below its holding current level, thereby rendering it nonconductive and effectively terminating the current through the load.

A more complete description of the invention is presented in the following specification and accompanying drawings, but it should be noted that the actual scope of the invention is as set forth by the ensuing claims. In the drawings:

FIG. 1 is a schematic diagram of a voltage-responsive current control circuit in accordance with the invention;

FIG. 1a is a schematic diagram of a modification of the circuit of FIG. 1;

FIG. 2 is a diagram of the structure of a bistable semiconductor diode of the type employed in the circuit of FIG. 1;

FIG. 3 is a curve showing the general shape of the voltage-current characteristic of a bistable semiconductor diode such as that in FIG. 2; and FIG. 4 is a diagram of the ideal charging current-voltage relationship for most types of rechargeable cells and batteries.

Referring to FIG. 1, there is shown a voltage-responsive current control circuit in accordance with the invention. The specific illustrated embodiment is a battery charging circuit, although the portion of the complete circuit lying between dotted lines 11a—11b, may be utilized in a wide variety of other applications than battery charging. Charging current is supplied to a battery 13 and will be abruptly terminated when the battery voltage reaches its full rated value.

The circuit comprises a pair of bistable semiconductor diodes 15 and 17 respectively (shown in FIG. 2) adapted to remain substantially nonconductive until the voltage there-across reaches a characteristic switching voltage level at which it conducts at a substantially lower constant voltage. These diodes are constructed so that the switching voltage level of one, namely diode 15, is greater than that of the second diode 17. In addition, each is adapted to return to the nonconductive state when the current conducted thereby falls below its characteristic holding current level. As mentioned above, semiconductor diodes of the type referred to are fully described and disclosed in co-pending application Ser. No. 41,415. Briefly however, as shown in FIG. 2, such a diode may comprise a unitary structure of three successive semiconductive zones 19, 21 and 23 which form an emitter junction 25 between the first outer zone 19 and one side of the central zone 21 and a collector junction 27 between the second outer zone 23 and the other side of central zone 21. The diode is constructed so that the width of second outer zone 23, which may be referred to as the collector, is at most equal to the diffusion length therein of minority carriers from the central zone 21. Means such as ohmic contacts 29a and 29b are respectively provided for the first outer zone or emitter 19 and the second outer zone or collector 23 for applying a voltage there-across which forward-biases emitter junction 25 and reverse-biases collector junction 27. A potential barrier region is thus established at collector junction 27 which extends completely across the collector zone 23 if the applied voltage should reach a predetermined switching level $V_S$. The potential across the barrier region then regeneratively collapses due to a regenerative increase in the concentration of minority carriers injected into central zone 21 by emitter junction 25. The result is that the diode conducts at a substantially lower constant voltage Vc, its incremental resistance then being extremely small. The diode zone structure may be either NPN or, as illustrated, PNP, in going from the emitter to the collector.

The forward voltage-current operating characteristic of the diode structure in FIG. 2 will have the general shape of the curve in FIG. 3, which is essentially the same as that in FIG. 3b of the above-identified co-pending application except that FIG. 3 herein also includes the reverse operating characteristic in the third quadrant. It is seen that insignificant current flows as a consequence of increasing forward bias voltage through a suitable resistance until the voltage across the diode reaches the characteristic switching level $V_S$. At that point the diode undergoes a rather sharp transition from the substantially nonconductive state to the conductive state wherein the voltage there-across drops to the substantially constant level Vc over a rather wide range of current. However, if the current through the diode is then reduced below the relatively low characteristic holding current level $I_H$, it will switch back to the nonconductive state. As noted in the co-pending application referred to, the characteristic switching voltage level $V_S$ may be set as desired over a wide range from a few volts to over 50 volts by controlling the width of collector zone 23, a narrower width yielding lower values of $V_S$. A higher resistivity of the semiconductor material of which the collector zone is constructed will also reduce the level of $V_S$. Thus, as described, diode 15 in FIG. 1 may readily be constructed to have a characteristic switching voltage level which exceeds that of diode 17 by a desired amount.

Returning now to the battery charging circuit of FIG. 1, the circuit further comprises an input terminal 31 and a common terminal 33. Resistive means, which may be adjustable, is provided for connecting diode 15 across those terminals and for further connecting diode 17 and the load or battery 13 there-across in series. Such resistive means may simply be a potentiometer 35 connected in series with diode 17 and battery 13 across input terminal 31 and common terminal 33, the tap of the potentiometer being connected to one terminal of diode 15 and the other terminal of diode 15 being connected to common terminal 33. This arrangement has the advantage that adjustment of the tap position of potentiometer 35 will not alter the resistance in the charging current circuit to battery 13. However, in some cases it may be adequate for the resistive means to simply be a rheostat as shown in FIG. 1a. The wiper terminal 36 thereof is connected in series with diode 17 and battery 13 to common circuit terminal 33. The fixed terminal of the rheostat is connected to input terminal 31, diode 15 being connected between such fixed terminal and common terminal 33. This arrangement will operate in virtually the same manner as the circuit of FIG. 1.

The circuit of FIG. 1 further comprises means for establishing a direct voltage across input terminal 31 and common terminal 33 which renders the second diode 17 conductive so as to supply current to the load or battery 13 so long as the battery voltage remains below the rated value corresponding to the fully charged condition. For example, such means may comprise a transformer 37 having a primary winding connected to an available source of alternating current. A resistor 39 and a half-wave rectifier diode 41 of conventional type are connected in series to one terminal of the secondary winding of transformer 37, and are shunted to the other terminal thereof by a filter capacitor 43. A filter resistor 45 may also be provided to cooperate with filter capacitor 43 in the usual manner to smooth out the ripple in the rectified substantially direct voltage thus established across terminals 31 and 33. By establishing this voltage at a level considerably greater than the rated voltage of battery 13, and by employing resistors 39 and 45, which provide a series resistance considerably greater than that of potentiometer 35 and battery 13 in series, the charging current supplied to the circuit will remain substantially constant in spite of variations in the terminal voltage and/or the internal resistance of battery 13.

The resistance introduced by the resistive means between diodes 15 and 17, or specifically that between the tap 36 of potentiometer 35 and the terminal thereof connected to the emitter of diode 17, will be designated Rx. The voltage across diode 17 in the conducting state may be designated as $Vc_{(17)}$, the resistance battery 13 as r, the terminal voltage of the battery as $V_T$, the charging current as Ic, and the voltage across diode 15 in the nonconducting state as $V_{15}$. The following relationship therefore holds while diode 17 is conducting and diode 15 is nonconductive:

$$V_{15} = IcRx + Vc_{(17)} + Icr + V_T \quad (1)$$

Diode 15 may be selected so that its characteristic switching voltage level $Vs_{(15)}$ exceeds the conducting voltage drop $Vc_{(17)}$ of diode 17 plus the fully charged rated voltage $V_{TB}$ of battery 13. Consequently, tap 36 of potentiometer 35 may be set so the charging current results in a voltage thereat, and so also across diode 15, which reaches the switching voltage level $Vs_{(15)}$ of that diode when the battery voltage reaches its rated value $V_{TB}$. In other words, the adjustable resistive means or potentiometer 35 may be set so the resistance Rx has a value which satisfies the following Equation 2:

$$Vs_{(15)} = IcRx + Vc_{(17)} + Icr + V_{TB} \quad (2)$$

With potentiometer 35 adjusted as described, as soon as the primary winding of transformer 37 is connected to the A.-C. supply diode 17 will conduct and substantially constant charging current will be supplied to battery 13. The terminal voltage thereof will therefore gradually increase, until finally the full rated value is attained. At that time, as indicated by Equation 2, the voltage across diode 15 will have reached its characteristic switching level and it will suddenly switch from the nonconductive to the conductive state. Since the incremental resistance of diode 15 in the conducting state is extremely small, the current conducted thereby will then suddenly increase from the previous virtually negligible value $I_1$ corresponding to the switching voltage level $V_S$ up to substantially the full charging current Ic. Since the current supplied at terminals 31 and 33 of the battery charging circuit continues to remain substantially constant, this results in a sudden reduction of the current through diode 17 to a value well below its holding current level $I_H$. That diode, therefore, will suddenly switch to its nonconductive high resistance state and so effectively terminate the current to the then fully charged battery 13. The current values referred to will be relatively as shown in FIG. 3. The complete charging cycle for battery 13 is substantially as shown in FIG. 4, where it is seen that the charging current remains at the virtually constant level Ic until the terminal voltage of the battery reaches its rated value $V_{TB}$, then dropping abruptly to zero. This is a substantially ideal charging characteristic for batteries or single cells of the zinc alkaline-mercury oxide, nickel cadmium, silver zinc, silver cadmium, and other similar, sealed and/or vented, rechargeable types.

As a specific example, a battery charging circuit in accordance with the invention has been successfully employed to charge single cells of the zinc alkaline-mercury oxide type. Ideally such cells should be charged by a constant current of about 75 milliamperes until a rated terminal voltage of 1.7 volts is obtained. An abrupt interruption of the charging current is then necessary to preclude a dangerous degree of gas production and consequent explosion or damage to the sealed enclosure employed for this type of cell. Both of the foregoing operating characteristics were achieved with the charging circuit of FIG. 1, wherein the semiconductor diodes 15 and 17 actually employed had the following numerical operating characteristics:

| Diode | Vs (Volts) | I₁ (ma.) | Vc (Volts) | I_H (ma.) | Conducting Voltage Drop at 75 ma. |
|---|---|---|---|---|---|
| 15 | 5.00 | 1.10 | 3.00 | 41.0 | 3.00 |
| 17 | 3.00 | 1.00 | 2.75 | 20.0 | 2.33 |

In the actual circuit referred to potentiometer 35 had a resistance of 60 ohms. Sharp interruption of charging current was achieved when the terminal voltage of battery 13 reached its rated value of 1.7 volts. However, by appropriate adjustment of the tap 36 of potentiometer 35 the charging current could be satisfactorily terminated at any value of battery terminal voltage from 0 up to about 2 volts.

It should be noted that the D.-C. supplied at terminals 31 and 33 of applicant's circuit need not be transformer derived if it is not necessary to establish isolation from the A.-C. power line. In such cases transformer 37 may simply be omitted. In addition, if extreme economy is desired, capacitor filtering of the rectified current can be dispensed with and capacitor 43 omitted. Of course, this may render the charging circuit susceptible to false switching by sudden transients in the A.-C. line. It is further evident that if a D.-C. source is already available it may be directly connected across charging circuit terminals 31 and 33 with only a current limiting resistor included in such connection.

While the invention has been described with particular reference to battery charging, it should be understood that this is meant to include single cells as well as multiple or series arrangements thereof. Bistable diodes of the type employed are available with characteristic switching voltage levels upwards of 50 volts or with current capacities of several amperes, making all such applications highly practical.

It will be obvious to those skilled in the art that by making certain changes in the described embodiment of applicant's control circuit, for example pre-biasing one or both of the semiconductor diodes, adaptation thereof to control transistor amplifiers or the like can readily be accomplished. The true teachings and scope of the invention are, therefore, as set forth by the ensuing claims.

What is claimed is:

1. A voltage-responsive current control circuit for supplying current to a load and for terminating such current when the load voltage reaches a selected value, said circuit comprising: a pair of bistable semiconductor diodes respectively adapted to remain substantially nonconductive until the voltage there-across reaches a characteristic switching voltage level at which each diode conducts at a substantially lower constant voltage, the switching voltage level of one of said diodes being greater than that of the second diode and each being adapted to return to the nonconductive state when the current conducted thereby falls below a characteristic holding current level; an input terminal and a common terminal for said control circuit; resistive means for connecting said one diode across said input and common terminals and for further connecting said second diode and said load there-across in series; and means for establishing a direct voltage across said input and common terminals which renders said second diode conductive so as to supply current to said load, said resistive means being responsive to such current to cause the voltage across said one diode to reach the switching voltage level thereof when the load voltage reaches said selected value; whereby said one diode then conducts and reduces the current through said second diode below its holding current level so as to render it nonconductive and effectively terminate the current through said load.

2. A voltage-responsive current control circuit for supplying current to a load and for terminating such current when the load voltage reaches a selected value, said circuit comprising: a pair of bistable semiconductor diodes respectively adapted to remain substantially nonconductive until the voltage there-across reaches a characteristic switching voltage level at which each diode conducts at a substantially lower constant voltage, the switching voltage level of one of said diodes being greater than that of the second diode and each being adapted to return to the nonconductive state when the current conducted thereby falls below a characteristic holding current level; an input terminal and a common terminal for said control circuit; adjustable resistive means for connecting said one diode across said input and common terminals and for further connecting said second diode and said load there-across in series; and means for establishing a direct voltage across said input and common terminals which renders said second diode conductive so as to supply current to said load, said resistive means being adapted to be adjusted so such current results in a voltage across said one diode which reaches switching voltage level thereof when the load voltage reaches said selected level; whereby said one diode then conducts and reduces the current through said second diode below its holding current level so as to render it nonconductive and effectively terminate the current through said load.

3. The current control circuit of claim 2, wherein said means for establishing a direct voltage across said input and common terminals is adapted to supply a substantially constant current to said circuit.

4. The current control circuit of claim 2, wherein said adjustable resistive means is a potentiometer of which one terminal is connected to said input terminal and of which the other terminal is connected in series with said second diode and said load to said common terminal, said one diode being connected between the tap of said potentiometer and said common terminal.

5. The current control circuit of claim 2, wherein said adjustable resistive means is a rheostat of which the fixed terminal is connected to said input terminal and of which the wiper terminal is connected in series with said second diode and said load to said common terminal, said one diode being connected between said fixed rheostat terminal and said wiper terminal.

6. A battery charging circuit for supplying charging current to a battery and for terminating such charging current when the battery voltage reaches its full rated value, said circuit comprising: a pair of bistable semiconductor diodes respectively adapted to remain substantially nonconductive until the voltage there-across reaches a characteristic switching voltage level at which each diode conducts at a substantially lower constant voltage, the switching voltage level of one of said diodes being greater than that of the second diode and each being adapted to return to the nonconductive state when the current conducted thereby falls below a characteristic holding current level; an input terminal and a common terminal for said charging circuit; resistive means for connecting said one diode across said input and common terminals and for further connecting said second diode and said battery there-across in series; and means for establishing a direct voltage across said input and common terminals which renders said second diode conductive so as to supply charging current to said battery, said resistive means being responsive to such current to cause the voltage across said one diode to reach the switching voltage level thereof when the battery voltage reaches its rated value; whereby said one diode then conducts and reduces the current through said second diode below its holding current level so as to render it nonconductive and effectively terminate the battery charging current.

7. The battery charging circuit of claim 6, wherein said means for establishing a direct voltage across said input and common terminals is adapted to supply a substantially constant current to said circuit.

8. A battery charging circuit for supplying charging current to a battery and for terminating such charging current when the battery voltage reaches its full rated value, said circuit comprising: a pair of bistable semiconductor diodes respectively adapted to remain substantially nonconductive until the voltage there-across reaches a characteristic switching voltage level at which each diode conducts at a substantially lower constant voltage, the switching voltage level of one of said diodes being greater than that of the second diode and each being adapted to return to the nonconductive state when the current conducted thereby falls below a characteristic holding current level; an input terminal and a common terminal for said charging circuit; adjustable resistive means for connecting said one diode across said input and common terminals and for further connecting said second diode and said battery there-across in series; and means for establishing a direct voltage across said input and common terminals which renders said second diode conductive so as to supply charging current to said battery, said resistive means being adapted to be adjusted so such current results in a voltage across said one diode which reaches the switching voltage level thereof when the battery voltage reaches said rated value; whereby said one diode then conducts and reduces the current through said second diode below its holding current level so as to render it nonconductive and effectively terminate the battery charging current.

9. A battery charging circuit for supplying charging current to a battery and for terminating such charging current when the battery voltage reaches its full rated value, said circuit comprising: a pair of bistable semiconductor diodes respectively adapted to remain substantially nonconductive until the voltage there-across reaches a characteristic switching voltage level at which each diode conducts at a substantially lower constant voltage, the switching voltage level of one of said diodes being greater than that of the second diode and each being adapted to return to the nonconductive state when the current conducted thereby falls below a characteristic holding current level; an input terminal and a common terminal for said charging circuit; a potentiometer connected between said input terminal and one terminal of said second diode; means for connecting said battery between said common terminal and the other terminal of said second diode; means for connecting said one diode between the tap of said potentiometer and said common terminal; and a substantially constant current source connected across said input and common terminals for establishing a direct voltage there-across which renders said second diode conductive so as to supply charging current to said battery, the tap of said potentiometer being adjustable so such current produces a voltage thereat across said one diode which reaches the switching voltage level of that diode when the battery voltage reaches said rated value; whereby said one diode then conducts and reduces the current through said second diode below its holding current level so as to render it nonconductive and effectively terminate the battery charging current.

10. A battery charging circuit for supplying charging current to a battery and for terminating such charging current when the battery voltage reaches its full rated value, said circuit comprising: a pair of bistable semiconductor diodes respectively adapted to remain substantially nonconductive until the voltage there-across reaches a characteristic switching voltage level at which each diode conducts at a substantially lower constant voltage, the switching voltage level of one of said diodes being greater than that of the second diode and each being adapted to return to the nonconductive state when the current conducted thereby falls below a characteristic holding current level; an input terminal and a common terminal for said charging circuit; a rheostat having its fixed terminal connected to said input terminal and its wiper terminal connected to one terminal of said second diode; means for connecting said battery between said common terminal and the other terminal of said second diode; means for connecting said one diode between the fixed terminal of said rheostat and said common terminal; and a substantially constant current source connected across said input and common terminals for establishing a direct voltage there-across which renders said second diode conductive so as to supply charging current to said battery, the wiper of said rheostat being adjustable so such current produces a voltage at the fixed terminal thereof and across said one diode which reaches the switching voltage level of that diode when the battery voltage reaches said rated value; whereby said one diode then conducts and reduces the current through said second diode below its holding current level so as to render it nonconductive and effectively terminate the battery charging current.

References Cited in the file of this patent

UNITED STATES PATENTS

| | | |
|---|---|---|
| 1,772,508 | Bascom | Aug. 12, 1930 |
| 2,079,500 | Foos | May 4, 1937 |
| 2,544,211 | Barton | Mar. 6, 1951 |
| 2,819,442 | Goodrich | Jan. 7, 1958 |
| 2,954,516 | Wallack | Sept. 27, 1960 |